US006408257B1

United States Patent
Harrington et al.

(10) Patent No.: US 6,408,257 B1
(45) Date of Patent: Jun. 18, 2002

(54) AUGMENTED-REALITY DISPLAY METHOD AND SYSTEM

(75) Inventors: Steven J. Harrington, Webster; James R. Vallino, Fairport, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/386,819

(22) Filed: Aug. 31, 1999

(51) Int. Cl.$^7$ .............................................. G01C 11/00
(52) U.S. Cl. .................................. 702/150; 348/14.16
(58) Field of Search ..................... 702/150; 348/14.16, 348/14.07, 64, 135, 136, 137, 262, 266, 333.08, 552, 561, 563, 564, 571, 739

(56) References Cited

U.S. PATENT DOCUMENTS

| | | | | |
|---|---|---|---|---|
| 5,490,239 A | * | 2/1996 | Myers | 345/581 |
| 5,641,288 A | * | 6/1997 | Zaenglein, Jr. | 434/21 |
| 6,064,749 A | * | 5/2000 | Hirota et al. | 382/103 |
| 6,084,979 A | * | 7/2000 | Kanade et al. | 382/54 |
| 6,278,479 B1 | * | 8/2001 | Wilson et al. | 348/47 |

OTHER PUBLICATIONS

Billinghurst, Mark; Weghorst, Suzane and Furness, Tom III, "Wearable Computers for Three Dimensional CSCW", International Symposium on Wearable Computers, Oct. 13–14, 1997, Cambridge, MA.

Fitzmaurice, George W. and Buxton, William, "An Empirical Evaluation of Graspable User Inerfaces: towards specialized, space–multiplexed input", Proceedings of CHI '97 Conference on Human Factors in Computing Systems, pp. 43–50.

Fitzmaurice, George W., Ishii, Hiroshi and Buxton, William, "Bricks: Laying the Foundations for Graspable User Interfaces", Proceedings of Human Factors in Computer Systems, CHI '95, pp. 432–449.

Robinson, Peter; Sheppard, Dan; Watts, Richard; Harding, Robert and Lay, Steve, "A framework for interacting with paper", The Eurographics Association 1997. Published by Blackwell Publishers, Malden, MA 02148, USA., vol. 6, (1997), No. 3, pp. C–329–C–334.

* cited by examiner

*Primary Examiner*—Marc S. Hoff
*Assistant Examiner*—Edward Raymond
(74) *Attorney, Agent, or Firm*—Fay, Sharpe, Fagan, Minnich & McKee, LLP

(57) ABSTRACT

A method and apparatus selectively displays a processor generated image in accordance with user instructions detected by a processor from a processor viewing device disposed to view a real reference item controlled by the user. The real item, preferably a page of paper, is disposed as a reference frame for an electronic image to be displayed. The orientation of the page is identified by the system. A sensing device, such as a video camera, identifies the position of the page. A display device, goggles, displays the image as a virtual display upon the page wherein the image is transformed in accordance with the identified positioning of the page. The user interaction with the displayed image as detected by the video camera manipulates the page, the contents thereon or can execute hyperlinks to other documents or sites.

35 Claims, 2 Drawing Sheets

AUGMENTED-REALITY DISPLAY METHOD AND SYSTEM

BACKGROUND OF THE INVENTION

This invention relates generally to a method and apparatus for viewing and interacting with a real world item such as a page, with a virtual display of imagery and/or text to give the illusion of holding a printed version of an electronic document without actually printing the displayed document. In augmented-reality, some form of physical display such as glasses, goggles or a helmet-mounted display is used to project or superimpose a computer-generated image onto the user's view of the real world. The system analyzes the viewer's image in real-time and adjusts the computer-generated image to correspond with the actual view. Such interaction combines some of the feel and function of a real item such as paper (holding it, writing on it) with the capabilities of an electronic document (dynamic, interactive). However, it would be appreciated to those of ordinary skills in the art that the invention could be readily adapted for use in other environments as, for example, where similar imaging methods are advantageously associated with other reality items for other purposes than displaying a document.

The ubiquitous use of PC workstations and the capabilities of the World Wide Web are leading to the use of electronic documents and the inclusion of dynamic components such as hyperlinks and video. These electronic documents are often not compatible with the static requirements of paper prints. Yet people still prefer paper for reading long documents, and paper is easily annotated and portable. There is a need for a display mechanism that combines the desirable properties of static paper and the dynamic capabilities of a CRT or LCD display. Research towards that goal includes work on Portable Document Readers and Electric Paper. This invention relates to an alternative approach based on the idea of augmented-reality.

In augmented-reality, a video camera can be used to provide the computer with the same view as seen by a user, then a computer-generated image is superimposed on that view. This is not virtual-reality where the user is immersed in a totally synthetic, computer-generated environment. Rather, augmented-reality is a combination of the synthetic computer-generated image superimposed upon an every day object of the real world.

Although augmented-reality display systems are known, they have had limited applications and usefulness. In particular, the reality portion identified by the video camera has largely been limited to a fixed view of a single setting, which is predetermined and strictly limited as to what may be presented and identifiable from the camera image. In addition, what can then be displayed on this controlled setting is also undesirably limited as to what can be shown, usually just a single image. Interaction with the display is essentially unknown.

As people become more accustomed to electronic, multimedia publishing as an alternative to conventional publishing on paper, there is a substantial need for more convenient and improved interactive control to enhance the freedom, variety and quality of display imagery in a user environment that is comfortable, convenient and easily controllable with regard to the viewing of an electronic display. Prior known application programs for electronic publishing are incompatible with augmented-reality display systems. Such programs are more accustomed to instruction processing comprising mouse, keyboard or button press representations for user instructions. There is a particular need for an application program that can recognize and translate convenient user commands in an augmented-reality setting, i.e., paper manipulation, hand and finger gestures, selected voice commands, in a real-time processing setting, for the improved interactive display scheme envisioned above.

The present invention contemplates coordinating a synthetic image with a real one with particular application to the display of documents comprising text and images so that the real image can be a piece or plurality of pieces of paper that the user can access. The user can manipulate electronic documents augmented with the pieces of paper, in a manner to organize them by the natural mechanism of selective positioning and movement of the pieces of paper. A scaling of the image is controlled by positioning of the paper relative to the eyes of the user so that the user is not confined to the limited screen space of a CRT or LCD display, but can have many documents available (analogous to a multi-window electronic display) by just turning the head from one piece of paper to another. Movement between different documents or images is easily realized by accessing of displayed hyperlinks. Such a system is readily adaptable to a plurality of uses with reality references of a variety of dimensions and characteristics, and which provides improved communicative and interactive capabilities between a user and a computer display system with a selective variety of interactive tools that are comfortable and convenient for the user.

A BRIEF SUMMARY OF THE INVENTION

In accordance with the present invention, there is provided a method and apparatus for displaying an electronically generated image and/or text in association with a real world reference item for an augmented-reality type of display. A real item such as a simple blank piece of paper or reference screen is disposed within a field of view and control of a user so that manipulation of the real item is intended to be communicative of user instructions. This item is selectively positionable by the user for purposes of communicating certain instructions to an applications program controlling the display. Other instructions can be captured by the application program through hand or tool gestures or voice commands. A sensing device such as a video camera identifies the existence and disposition of the real item. A display device, such as a headset, goggles or glasses displays the images as a virtual display overlay upon the real item. The image is displayed in accordance with the selective positioning of the item by the user. If the item comprises a piece of paper, movement of the paper towards the user will effectively enlarge the display.

In accordance with another aspect of the present invention, the sensing device comprises a video camera mounted on a headset and the image perceived by the user is from the perspective of the lens in the camera. The computer performs real-time analysis of the perceived image to identify whether an item within the image is the real reference item, such as a piece of paper, and then electronically generates the virtual image over the piece of paper so that from the user's perspective the image comprises a printed document. It is a particular feature of the invention that the user can now interact with the perceived image by manipulation of the paper or performing certain preselected and recognizable gestures or voice commands.

In accordance with the method of the present invention, the first step comprises capturing relevant information within the image perceived by the video camera. In the preferred embodiment this entails identifying and locating a piece of paper. The orientation of the piece of paper is recognized so that the overlay can be properly matched for the desired image appearance. The user then selects an image to be electronically overlaid on the image of the piece of paper. The system transforms the image in accordance with the paper's orientation to accomplish the appropriate overlay appearance. The augmented-reality image is then displayed to the user.

An important benefit obtained by the present invention is an augmented-reality display system which is interactive with the user to allow manipulation of the image in accordance with user instructions.

A further benefit is an analysis scheme for identifying the relevant reality items within the perceived image and the preparation of an appropriate display of the electronic portion of the resulting image to present an illusion to the user of a printed document that can be dynamically altered by user interaction in the manner of an electronic document.

Other benefits and advantages of the subject augmented-reality display method and system will become apparent to those skilled in the art upon a reading and understanding of this specification.

BRIEF DESCRIPTION OF THE DRAWINGS

The invention may take physical form in certain parts and steps and arrangements of parts and steps, the preferred and alternative embodiments of which will be described in detail in the specification and illustrated in the accompanying drawings which form a part hereof and wherein.

DETAILED DESCRIPTION OF THE INVENTION

Figure 1:
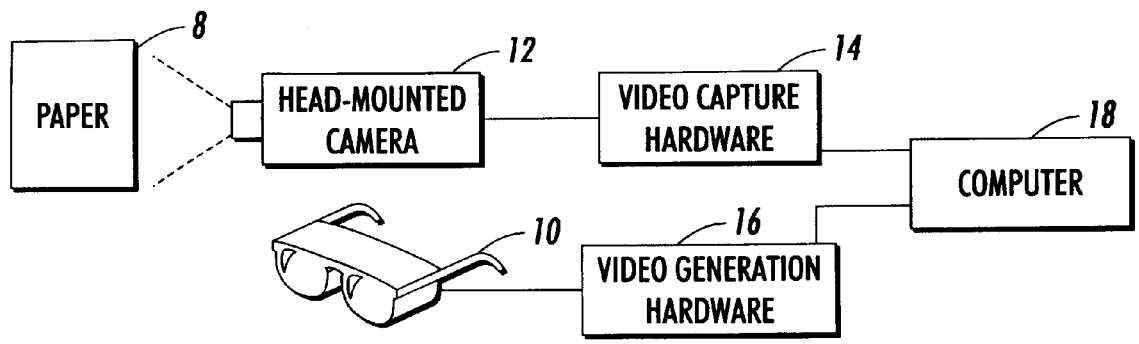
FIG. 1 comprises a simplified block diagram of the basic structural elements of the invention.

Referring now to the drawings wherein the Showings are for the purposes of illustrating the Preferred and alternative embodiments of the invention only and not for purposes of limiting the invention, the FIGURES show an augmented-reality display system wherein the images are made adjustable through interaction of the user with the image itself.

More specifically, with reference to FIG. 1, the augmenting image is perceived by the user through or in a set of glasses or goggles 10 which is intended to comprise any type of headset through or in which an electronic image can be displayed to the wearer. A sensing device such as a video camera 12 captures the normal field of view of the user of the headset 10 and thus should be small enough so that it can be preferably mounted on the headset in a manner to give the user the comfortable impression that the image he perceives is substantially similar to the one he would see when not wearing the headset 10. There are many head-mounted displays commercially available. Some are completely immersive in that they completely block out the real world. Others, known as "heads-up" displays superimpose the electronic display over a view of the real world. Although either type of display system is within the scope of the invention. It is merely important that the camera 12 provide the computer 18 with the same view that the user sees so that the synthetic image is displayed in a manner for comfortable and convenient interaction between the real reference item, i.e., a piece of paper, within the field of view that the user may be holding and manipulating.

The video capture hardware 14 comprises a circuit that can convert the analog signal from the camera 12 into a digitized frame that can be stored in the computer 18 for analysis as will be discussed more fully below. Essentially, the hardware 12 outputs a signal to the computer as a digitized and processible representation of what the user sees from the camera's field of view. The video generation hardware 16 takes a bit map of pixel values from the computer 18 and converts them into a television format that can be displayed on the headset 10. The signal generated by the camera 12 is different from the signal displayed on the headset 10 by the addition of the computer-generated electronic image to thereby form a synthetic image as an augmented-reality display.

Figure 2:
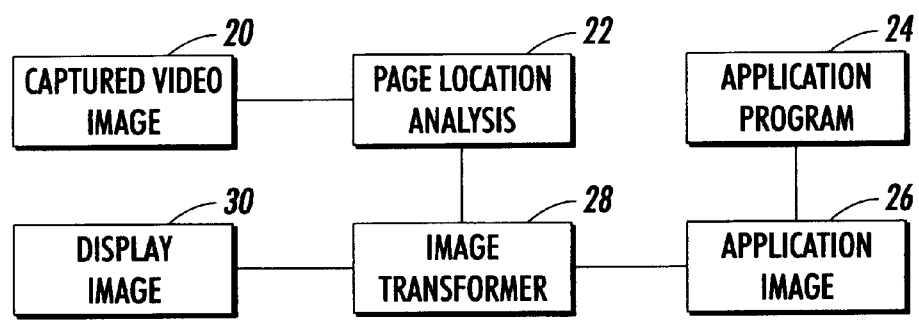
FIG. 2 is a block diagram of the operational modules for implementing the invention.

With reference to FIG. 2, certain software functions of the hardware are shown. The computer 18 must interpret the captured video frames to locate a piece of paper within the camera view. Although the application preferably discloses paper as the real item to be sensed by the camera, it is within the scope of the invention to employ other convenient reference items, such as a screen or reference template, for example where the synthetic image comprises a moving illustration or three-dimensional objects such as may be generated by design or operational test programs. For purposes of simplicity, the remaining portion of the specification will be limited to pieces of paper as the reference frame for the resulting synthetic image.

FIG. 2 details the functions regarding the analysis and image preparation processes of the computer 18. The overall objective of the captured information processing is to interpret the video frames for locating pieces of paper within the view of the camera. Additionally, the computer-generated image is transformed and distorted such that when its image is presented in the head-mounted display 10 it overlays the paper as seen by the user. The digitized captured video frames 20 are analyzed by page location analysis module 22 to locate the position of one or more pieces of paper within the view of the camera 12. A piece of paper can be identified by its white color against a darker background. To identify the existence of a page within a captured video image, the analyzer 22 can examine sample pixels within the image to see if any are white. Once a white pixel (indicating the presence of a page) is found, the position of the page can be determined using well-known edge finding techniques. For example, starting with the known white pixel one can step through the pixels (up, down, right or left) examining each until a non-white value is found, indicating the edge of the page. Another approach to finding a corner position of a page is to step through the white points in the page in a direction diagonal to the sides until two edge points are found.

Figure 5:
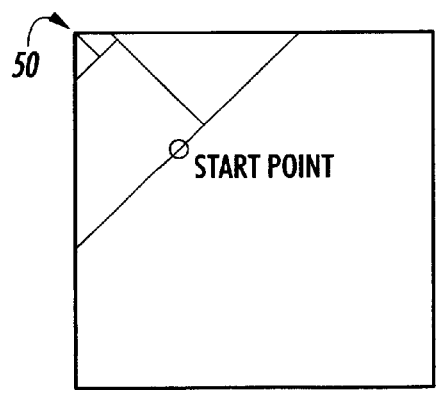
FIG. 5 is a schematic diagram to illustrate one scheme for identifying a piece of paper within a camera viewing area.

Note in FIG. 5, the midpoint of the line between the edge points is used as a starting point for a search perpendicular to the original diagonal. The edge point found by this latest search is used as a starting pointing for repeating the process until a corner so is reached and the two edge points meet. This approach can be used when the straight edge of the paper is partially hidden (as by the hand holding the page). The former approach can be used when the corner is hidden. Both of the foregoing edge-finding techniques are well-known in the art. The application program module generates any image that could be selected by a user as an electronic image on a CRT or LCD. The application image 26 is thus equivalent to opening up a window on a screen. For example, the user could select as the application image 26 a particular internet browser engine which, based upon the located orientation of the piece of paper, would be transformed 28 to exactly match the detected orientation of the piece of paper so that the displayed image 30 provides the illusion of the web page actually appearing on the blank piece of paper being held by the user. In other words, once the position of the paper page (e.g., the position of its corners) is determined, this information can be used to correctly distort the application's image so it overlays the paper in the eyes of the user. This is a well-known problem in computer graphics of mapping a textual (the application image) onto a projected image. The translation, rotation, scaling and perspective operations can be applied to the image using standard image processing methods, or specialized textual mapping hardware may be employed for improved processing speed. The information analysis and image preparation need be accomplished in essentially real-time for the image display to appear as real as possible to the user.

Figure 3:
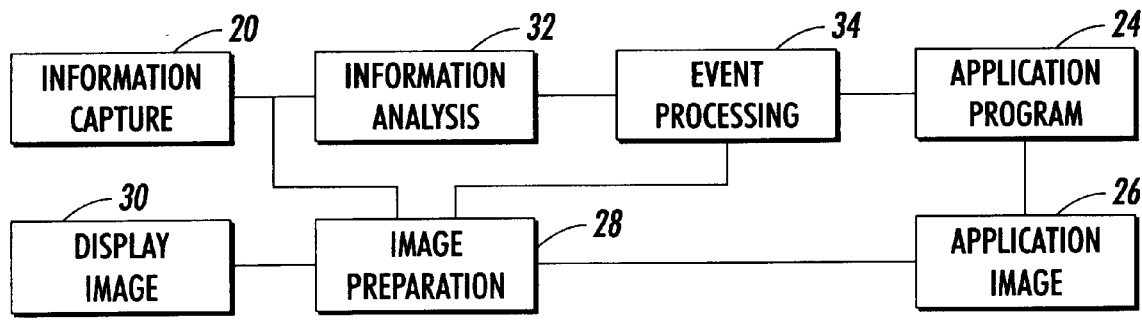
FIG. 3 is a block diagram of the operational modules of an alternative embodiment of the invention.

With particular reference to FIG. 3, an alternative system architecture is shown that provides enhanced interaction for typical user applications. In particular, the page location analysis module of FIG. 2 has been expanded to comprise an information analysis module 32 and event processing module 34.

Figure 4:
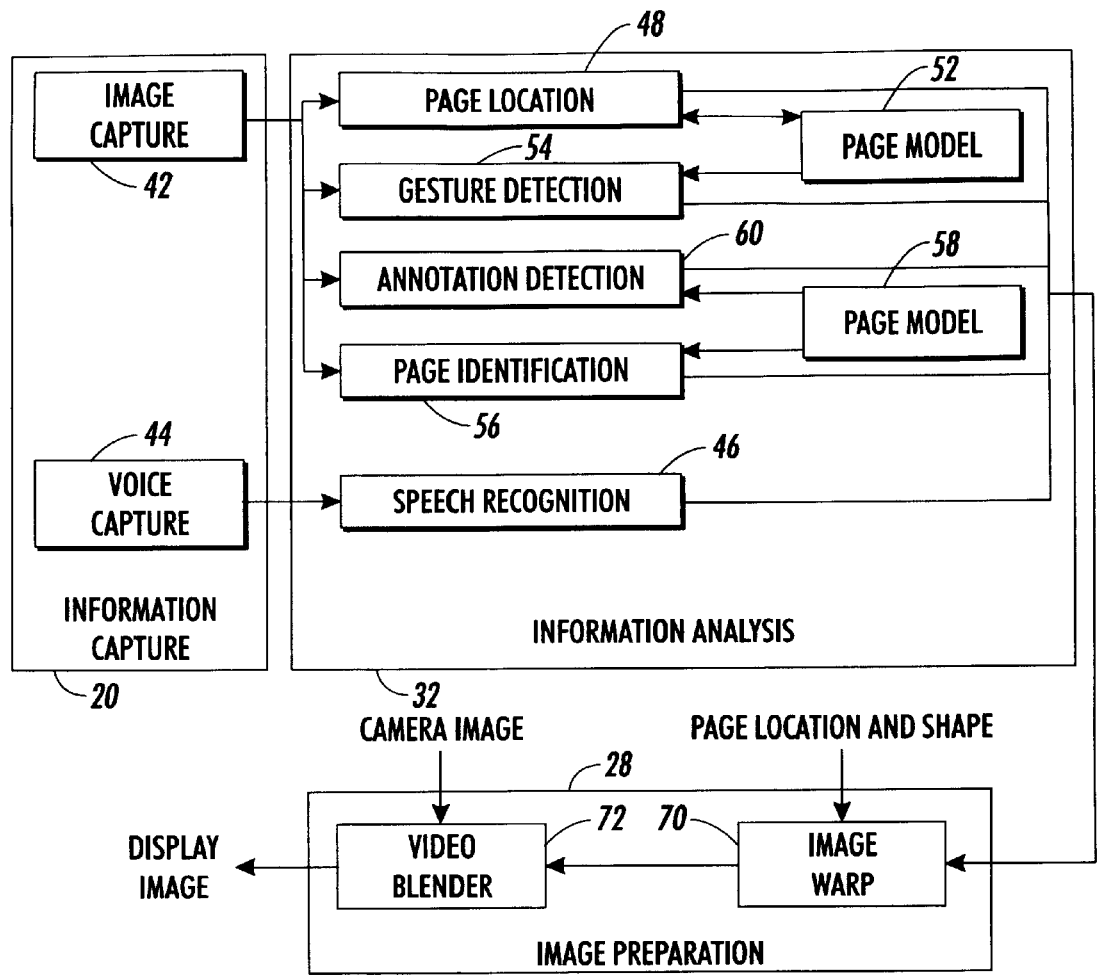
FIG. 4 is an embellished operational flow diagram of certain of the modules of FIG. 3.

With reference to the operational flow diagram of FIG. 4, information capture module 20 is enhanced not only for video image capture 42 but also voice commands 44 so that the user can communicate and manipulate the application image by both image and speech.

The information analysis module is correspondingly enhanced for speech recognition 46, and image analysis. The page locating process 48 may refer to a model of the page 52 that could, for example, give the last known location and orientation of the page, and also predict the page location for the current frame. The gesture detection module 54 identifies hand, finger or tool gestures selected and identifiable as a user command to the computer 18. For example, again assuming the image is an internet browser, and analogizing the operation to a screen wherein interaction occurs with a mouse pointer and button press, the finger of the user could accomplish the exact same function as the mouse pointer and speech recognition of a command such as "select" will accomplish the functions of the button press. Thus, a combination of a certain gesture and speech will allow the user to execute a hyperlink to another website. In addition, the model 52 of the current page may also provide useful information to the gesture detection module, for example, the pointing gesture can be expressed in terms of a location on the page. For page identification 56 a data base of possible matching pages might be needed. Comparing a reference page from a data base 58 of possible matching pages might be needed. Comparing a reference page from the data base 58 to the current page identification 56 can also provide a way to detect 60 if annotations have been added to the page. Certainly, additional input capture, additional analyses and additional supporting information are possible. The example modules given are meant to be illustrative of one particular system architecture. The outputs of the information analysis module 32 are events, such as a change in the page position, and the information associated with the event, such as the new page location. Other events such as a change in a gesture, the identification of a page, or the entry of a command are also examples of events. These events and their associated data are given to the event processing module 34. The job of the event processing module 34 is to convert the events and data from the information analysis module 32 to events suitable to the applications, and also to provide the analysis data needed to construct the display image. Most application programs 24 are typically designed with the expectation of a keyboard and mouse as the interface mechanism. In the augmented-reality system of the subject invention, these devices are replaced with gestures, movements of the paper and voice commands. The event processing module must translate the gestures, movements and commands into the corresponding keyboard and mouse events or event sequences that the application program understands. For applications running under a windows system, the translated commands can be generated through the windowing system so that no changes to the applications are needed for input.

The windowing system can provide for the application image 26 to be generated in a virtual frame buffer. This image would not actually be displayed, but would be available for further processing by the image processing module 28. This approach allows the applications to be run without modifying the application program module 24. For example, a mere turning of the page in a horizontal direction can be interpreted as a gesture command to go to a next page of a textual document. Accordingly, this gesture must be translated into the same signal that the application program would receive from a button press on a next page icon for a textual document display. Similarly, flipping the page in a vertical direction can be interpreted as a command to scroll the document. The event processing module 34 thus provides a simple way for the subject system to encompass a large body of existing application programs.

The image preparation module 28 has two major functions. The first is to warp the application image into the location and shape that matches the page being viewed by the user. The second is to merge 72 the camera image and the warped application image to create the augmented image that will be displayed to the user. The image preparation occurs in real-time to provide a reasonable display image. For this reason, the image preparation may make use of special hardware in order to accomplish the warping and blending processings in minimal time.

This architecture could be generalized to support multiple applications. Each application would write its image in its own virtual frame buffer and each would be warped to match a distinct page for a plurality of papers identified in the viewing area. Warped images can be combined into a single overlay for blending with the camera image to form the displayed image.

The invention has been described with reference to preferred and alternative embodiments. Obviously, modifications and alterations will occur to others upon the reading and understanding of this specification. It is my intention to include all such modifications and alterations insofar as they come within the scope of the appended or the equivalents thereof.

Having thus described my invention, We now claim:
1. An augmented-reality display system comprising:
   an image source for generating an augmenting image;
   a real item disposed as a display reference frame for the augmenting image and selectively positionable by a user to a plurality of different positions,
   a sensing device for identifying the item; and,
   a display device for displaying the augmenting image as a merged display with the item wherein the image is adjusted and displayed in accordance with the selective positioning of the item by the user.

2. The system as claimed in claim 1 wherein the item comprises a piece of paper.

3. The system as defined in claim 1 wherein the item comprises a screen.

4. The system as defined in claim 1 wherein the sensing device comprises a video camera for real-time detection of a position of the real item.

5. The system as defined in claim 4 wherein the display of the augmenting image is distorted in real-time in accordance with the position of the real item.

6. The system as defined in claim 1 wherein the sensing device further identifies preselected events as user instructions for adjustment of the displaying by the display device.

7. The system as defined in claim 6 wherein the preselected events comprise alterings of position of a piece of paper.

8. The system as defined in claim 7 wherein the altering comprises annotating the piece of paper.

9. The system as defined in claim 6 wherein the preselected events comprise movements of a piece of paper.

10. The system as defined in claim 6 wherein the preselected events comprise a voice command.

11. The system as defined in claim 6 wherein the preselected events comprise a gesture.

12. The system of claim 11 wherein the gestures are hand or finger gestures.

13. The system as defined in claim 6 wherein the preselected events comprise a combination of gestures and speech.

14. The system as defined in claim 6 wherein the preselected events comprise positioning and movement of a tool.

15. The system as defined in claim 1 wherein the sensing device comprises a video camera and the merged display as perceived by the user is from a perspective of the lens of the camera.

16. The system as defined in claim 1 wherein the display device comprises a headset and the merged display as perceived by the user is from a perspective of the user through the headset.

17. The system as defined in claim 16 wherein the sensing device comprises a video camera mounted on the headset.

18. A method for selectively displaying a processor generated image in accordance with a user instruction detected by a processor from a processor viewing device disposed to view a tool controlled by the user as a representation of the user instruction, comprising the steps of:

locating by the processor of the tool within a viewing area of the processor viewing device;

recognizing by the processor of a disposition of the tool as the representation of the user instruction;

adjusting the image in accordance with the instruction; and, displaying the image in accordance with the adjusting.

19. The method as defined in claim 18 wherein the tool comprises a piece of paper and the locating comprises identifying the piece of paper within the viewing area.

20. The method as defined in claim 19 wherein the processor viewing device comprises a camera and the locating comprises defining of the viewing area by a selective orienting of the camera by the user.

21. The method as defined in claim 20 wherein the recognizing comprises identifying the disposition as a relative position of the piece of paper to the camera.

22. The method as defined in accordance with claim 21 wherein the displaying comprises projecting the image as an overlay of the piece of paper through a head-mounted display.

23. The method as defined in claim 22 wherein the camera is disposed on the head-mounted display and the recognizing comprises the user pointing the camera at the piece of paper.

24. A method of adjusting an image viewed through a head-mounted display by projecting the image as a virtual image onto a local piece of paper, wherein the selective disposition of the piece of paper affects the projecting, comprising:

locating the piece of paper with a camera included in the head-mounted display;

recognizing an orientation of the piece of paper;

selecting an image to be viewed;

transforming the image in accordance with the orientation; and, displaying the image whereby the image appears to a user as an overlay on the piece of paper.

25. The method as defined in claim 24 wherein the recognizing comprises identifying the selective disposition as a relative position of the piece of paper to the camera.

26. The method as defined in claim 25 wherein the identifying comprises locating white pixels against a darker background and determining the selective disposition of the piece of paper with an edge finding technique.

27. The method as defined in claim 26 wherein the transforming comprises distorting the image for a matching overlay of the piece of paper to the eyes of a user.

28. The method as defined in claim 27 wherein the distorting includes image processing comprising translating, rotating, scaling and perspective operating.

29. The method as defined in claim 24 wherein the locating includes locating a plurality of pieces of paper.

30. The method as defined in claim 29 wherein the displaying includes displaying a plurality of images and associating a one of the images with an associated one of the plurality of pieces of paper.

31. The method as defined in claim 24 further including interacting by the user with the image with predetermined commands for manipulating the image, and wherein the recognizing includes identifying the commands and the transforming includes preparing the image in accordance with the commands.

32. The method as defined in claim 31 wherein the identifying includes analyzing the image for page location and identification, gesture detection, and annotation detection.

33. The method as defined in claim 32 further including capturing voice and recognizing speech as representations of user commands.

34. The method as defined in claim 32 wherein the analyzing includes accessing a page model memory and a page database.

35. The method as defined in claim 24 wherein the transforming includes warping a computer-generated application image with a recognized paper location and shape, and blending the warped image with a camera image for generating the displayed image.

* * * * *